United States Patent
Kallela et al.

(10) Patent No.: US 7,100,093 B2
(45) Date of Patent: Aug. 29, 2006

(54) METHOD FOR THE AUTOMATED DETERMINATION OF FAULT EVENTS

(75) Inventors: Jari Kallela, Espoo (FI); Gerhard Vollmar, Meckenheim (DE); Szanislo Szöke, Gesues (BE)

(73) Assignee: ABB Research LTD, Zurich (CH)

( * ) Notice: Subject to any disclaimer, the term of this patent is extended or adjusted under 35 U.S.C. 154(b) by 384 days.

(21) Appl. No.: 10/209,382

(22) Filed: Jul. 29, 2002

(65) Prior Publication Data
US 2003/0028830 A1  Feb. 6, 2003

Related U.S. Application Data

(63) Continuation of application No. PCT/EP00/00715, filed on Jan. 29, 2000.

(51) Int. Cl.
*G06F 11/00* (2006.01)

(52) U.S. Cl. .................. 714/47; 714/48; 702/183; 702/188

(58) Field of Classification Search .............. 714/47
See application file for complete search history.

(56) References Cited

U.S. PATENT DOCUMENTS

| | | | |
|---|---|---|---|
| 5,067,099 A * | 11/1991 | McCown et al. | 702/183 |
| 5,737,581 A | 4/1998 | Keane | |
| 5,818,713 A * | 10/1998 | Uchihara et al. | 700/79 |
| 5,859,964 A * | 1/1999 | Wang et al. | 714/48 |
| 5,874,640 A | 2/1999 | Bryant et al. | |
| 5,983,364 A * | 11/1999 | Bortcosh et al. | 714/25 |
| 6,108,616 A * | 8/2000 | Borchers et al. | 702/183 |
| 6,301,517 B1 * | 10/2001 | Doran et al. | 700/110 |
| 2002/0077711 A1 * | 6/2002 | Nixon et al. | 700/51 |

OTHER PUBLICATIONS

Bob Hansen: "Learning the Power Of Overall Equipment Effectiveness", *The 4th Annual Machinery Reliability Conference and Exhibition*, Apr. 12-14, 1999, Cincinnati, Ohio, pp. 19-30.
H. Najjari et al.: "Integrated Sensor-Based Control System For A Flexible Assembly Cell", *Mechatronics*, vol. 7, No. 3, 1997, pp. 231-262.

* cited by examiner

*Primary Examiner*—Robert Beausoliel
*Assistant Examiner*—Philip Guyton
(74) *Attorney, Agent, or Firm*—Laurence A. Greenberg; Werner H. Stemer; Ralph E. Locher

(57) ABSTRACT

A method is described for the automated determination of fault events by evaluation of field data of a production installation within a system for determining the effectiveness (overall equipment effectiveness (OEE)) of the production installation and for the analysis of causes of faults. The determination of the fault events takes place using a data processing device and programs stored in it for carrying out the functions of a fault event detector and an OEE script configurer. The OEE script configurer accesses a prescribed productivity model specific to a production installation type, generates an OEE script with likewise prescribed configuration data taken into account and stores it in an OEE script memory. The fault event detector accesses the OEE script, calls up field data from a data server, derives fault events from the field data according to processing instructions of the OEE script, and stores them in a fault database.

3 Claims, 5 Drawing Sheets

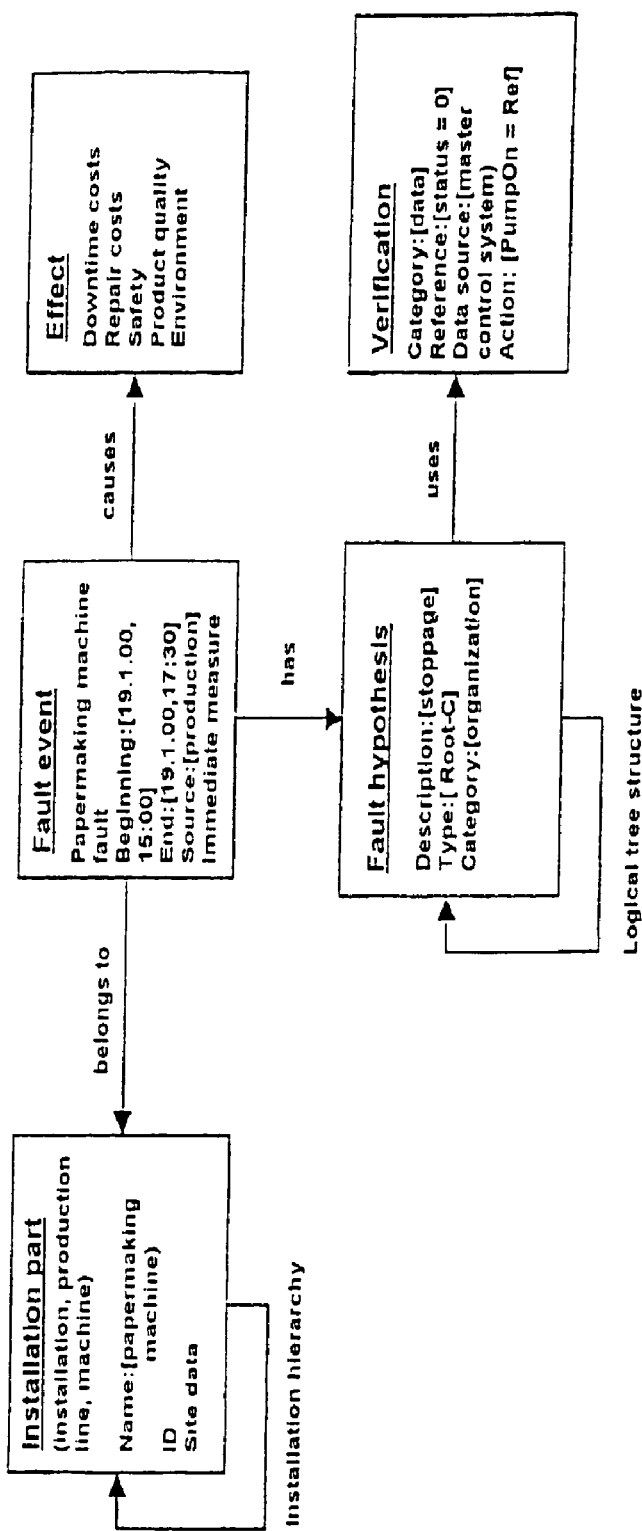
Fig. 3 Productivity model - conceptual

```
Papermaking machine fault verification ()
(
// Script for the verification of fault hypotheses of a papermaking machine // Verifying the fault hypotheses
    if( PumpOn = 0 ) then (
        newState = 3 ; // 3 stoppage
    )
    else (
        if( WebOn = 0 ) then (
            newState = 2 ; // 2 fibre breakage
        )
        else (
            if( RollSpeed < 20 ) then (
                newState = 1 ; // 1 creeping speed
            )
            else (
                newState = 0 ; // 0 undisturbed operation
            )
        )
    )

// Storing of the fault events in the fault database
    if( newState != oldState) then (
        NewClassId(Now, NewClassL1);
        oldState = newState ;
    )
)
```

Fig. 4: Verification script

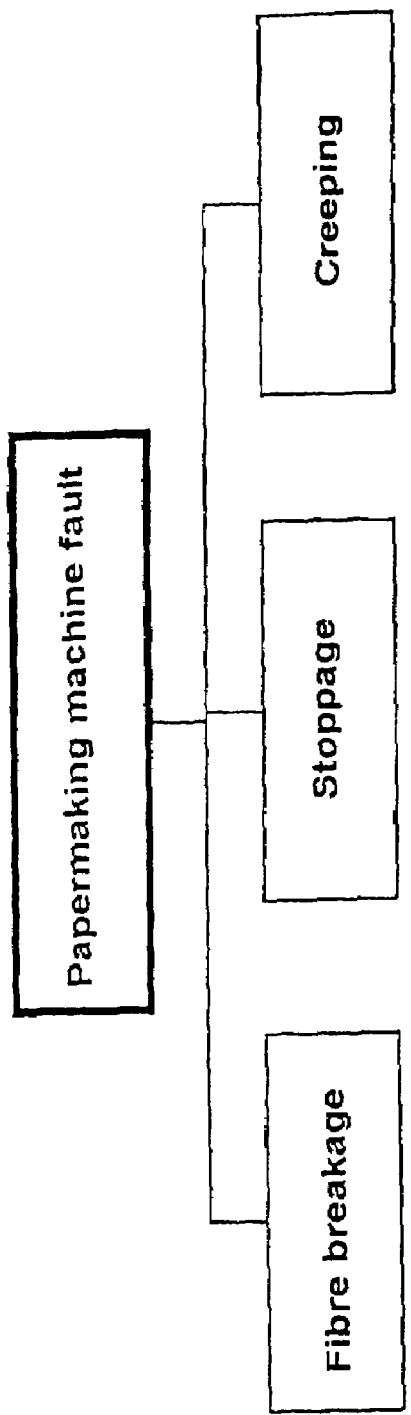
Fig. 5: Fault tree

US 7,100,093 B2

METHOD FOR THE AUTOMATED DETERMINATION OF FAULT EVENTS

CROSS-REFERENCE TO RELATED APPLICATION

This application is a continuation of copending International Application No. PCT/EP00/00715, filed Jan. 29, 2000, which designated the United States and was not published in English.

BACKGROUND OF THE INVENTION

Field of the Invention

The invention relates to a method for the automated determination of fault events by evaluation of field data of a production installation within a system for determining the effectiveness (overall equipment effectiveness (OEE)) of the production installation and for the analysis of causes of faults.

Effectiveness is understood here as the concept of "Overall Equipment Effectiveness, OEE", which is described for example in the reference by Robert Hansen, titled "Learning the Power of Overall Equipment Effectiveness", in the 1999 conference report Machinery Reliability Conference and Exposition, and in "The Meeting of Machinery Reliability Minds", April 12–14, Cincinnati, Ohio, pages 19 to 30, published by Industrial Communications, Inc., 1704, by Natalie Nehs Dr., Knoxville, Tenn. 37931.

OEE is accordingly a method for determining a percentage that indicates to what extent the actual productivity in each case reaches a planned, that is prescribed, productivity. OEE is also referred to as the multiplication of synergistic parameters, which define the "health" of a process, to be specific OEE=availability×processing speed×quality.

For commercial reasons, and to safeguard product quality, operators of production installations have an interest in determining a desired effectiveness, which can be achieved in an undisturbed operation, and comparing the effectiveness at a given time with it. If the effectiveness at a given time deviates from the desired value, this indicates losses in productivity. It must then be determined which fault events exist and what is causing them. The causes may have their roots in physical, human or organizational areas.

Various methods and techniques can be used for the analysis of faults, that is events which adversely influence the respective production objective. The most important of these are failure modes and effects analysis (FMEA), fault tree analysis, or methods of statistical evaluation, such as for example the Pareto analysis [by John Moubray, RCM2, Butterworth-Heinemann, Second Edition 1997].

In automated production operation, analog and digital field data are usually stored in history databases for relatively long periods of time, so that in principle data required for an evaluation for the purpose of determining fault events are available. Fault events may be thought of as a calculation variable into which the field data are transferred in accordance with a calculation rule.

However, one problem is that the typical capabilities provided by a master control system or a database for the configuration of fault possibilities are very restricted. There is also no known standard configuration of calculation variables. For an analysis that can be carried out quickly and simply, it is not sufficient just to consider alarms or arithmetically calculated values. A meaningful fault event requires a number of signals to be combined in compliance with certain rules and boundary conditions. With the capabilities of a master control system, the configuration of such complex relationships is very complex, or not possible at all.

A further problem is that a continual execution of complex calculation functions, which take up a correspondingly great amount of computing time, and a storage of complex data structures is undesired in typical master control systems, which operate in real time.

SUMMARY OF THE INVENTION

It is accordingly an object of the invention to provide a method for the automated determination of fault events which overcomes the above-mentioned disadvantages of the prior art methods of this general type, which makes it possible to derive fault events from field data in an automated manner and with comparatively little computing effort.

With the foregoing and other objects in view there is provided, in accordance with the invention, a method for an automated determination of fault events by evaluation of field data of a production installation within a system for determining an effectiveness of the production installation and for an analysis of causes of faults. The method includes providing a data processing device having a fault event detector, an overall equipment effectiveness (OEE) script configurer, and programs stored therein for carrying out functions of the fault event detector and the OEE script configurer. The data processing device further includes a fault database for storing determined fault events and an OEE script memory. The fault events are determined by using the OEE script configurer to access a prescribed productivity model specific to the production installation, generate an OEE script with likewise prescribed configuration data taken into account, and store the OEE script in the OEE script memory. The fault event detector is used to access the OEE script, call up the field data from a data server of the production installation according to execution requirements of the OEE script, derive the fault events from the field data according to processing instructions of the OEE script, and store the fault events together with previously entered fault events, in the fault database.

In the method, a productivity model specific to a production installation is accordingly accessed under program control and an easy-to-run OEE script is generated with prescribed configuration data taken into account. In this case, one of a number of productivity models provided in a server of a network, in particular the INTERNET, is preferably accessed. According to the instructions of the OEE script, fault events are determined, likewise under program control, on the basis of called-up field data and also additional fault-event-related data, and are made available for further use in a fault database.

A major advantage of the method is that its use within a system for determining the effectiveness (overall equipment effectiveness (OEE)) of a production installation and for the analysis of causes of faults creates a system capable of learning and adapting which requires comparatively little computing effort.

In accordance with an added mode of the invention, the prescribed productivity model specific to the production installation is prescribed by a WEB browser calling up a productivity model specific to the production installation stored on a WEB server and feeding it to the OEE script configurer.

In accordance with a further mode of the invention, there is the step of entering additional information on the fault events taken into account by the fault event detector in a determination of the fault events into the data processing device using a data input.

Other features which are considered as characteristic for the invention are set forth in the appended claims.

Although the invention is illustrated and described herein as embodied in a method for the automated determination of fault events, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block diagram of a representation of a productivity model;

FIG. 4 shows a verification script; and

FIG. 5 is a block diagram of a fault tree.

DESCRIPTION OF THE PREFERRED EMBODIMENTS

Figure 1:
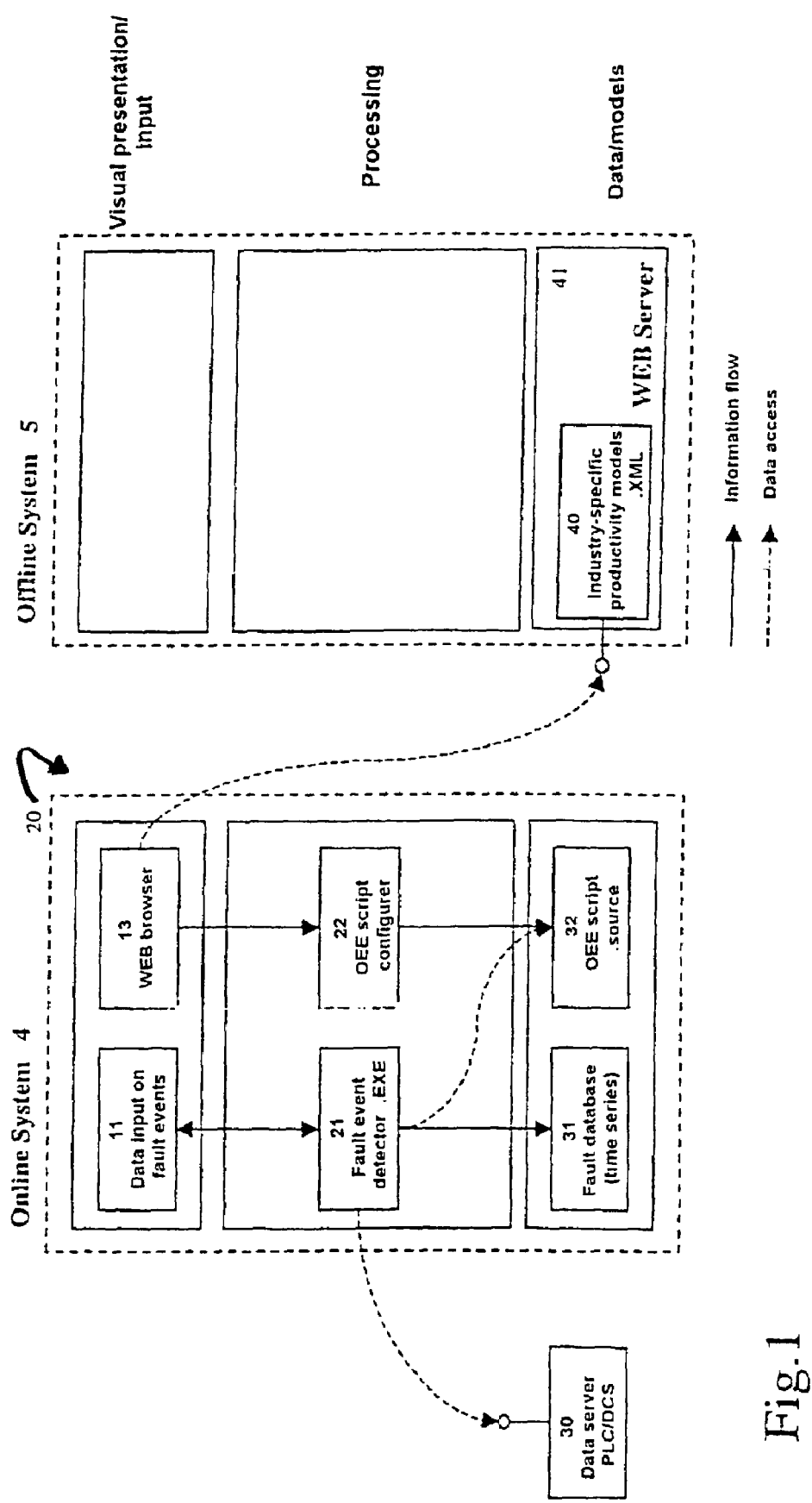
FIG. 1 is a block diagram of a system for carrying out the method according to the invention.

Referring now to the figures of the drawing in detail and first, particularly, to FIG. 1 thereof, there is shown an online system part 4 and an offline system part 5 of a service system. The online system part 4 is formed by a data processing device 20, which is set up for carrying out the functions of a fault event detector 21 and an OEE script configurer 22. Present as data stores are a fault database 31 and an OEE script memory 32. Fault event data can be entered via a data input 11. By a WEB browser 13, a productivity model 40 specific to a production installation type can be called up from a WEB server 41. The WEB server 41 is part of the offline system part 5.

The OEE script configurer 22 is set up for producing an OEE script on the basis of the productivity model 40 and configuration data and storing it in the OEE script memory 32.

The fault event detector 21 is set up for accessing field data of a data server 30 of a master control system of a production installation according to the requirements of the OEE script, deriving fault events from them and storing the latter in the fault database 31.

Figure 2:
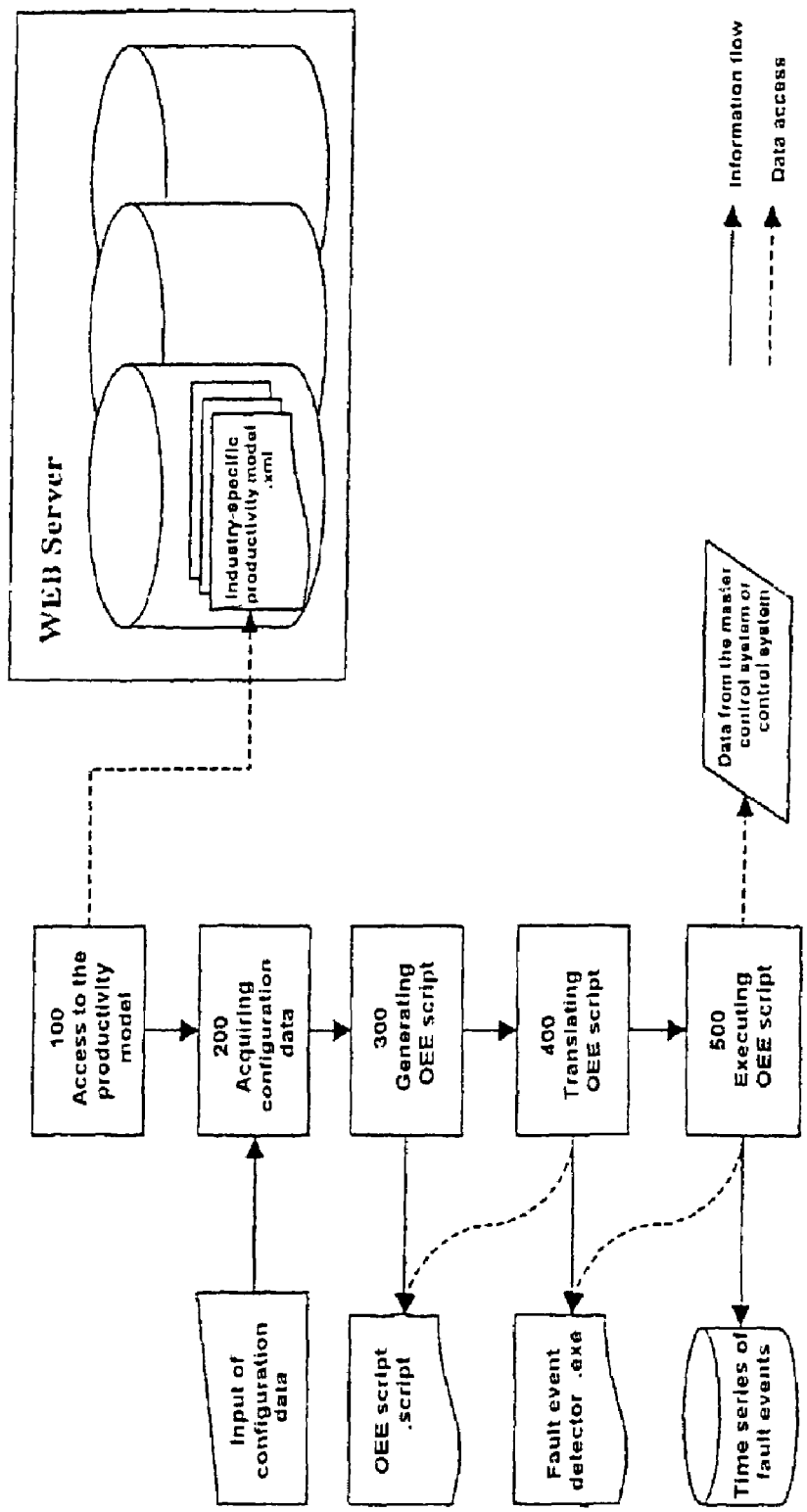
FIG. 2 is a block diagram showing steps of the method sequence.

FIG. 2 shows the individual steps of the method for the automated determination of fault events.

In step 100, the productivity model specific to a production installation type is accessed. The productivity model is on a WEB server in XML format. This makes access possible with a WEB browser via the INTERNET. FIG. 3 shows a special productivity model in a conceptual representation. Step 100 takes from the model the necessary information for preparing the OEE script.

In step 200, configuration data are acquired by the WEB browser. For example, the verification criteria of the model must be combined with the addresses of signals from the master control system. In the example shown in FIG. 3, the 'verification' object in the 'action' attribute includes the condition [PumpOn=0]. Accordingly, 'PumpOn' must be assigned to a signal address.

In step 300, an OEE script for verifying fault hypotheses is produced with the configuration data and the information from the model. FIG. 5 shows in this respect the special fault tree that represents the 'fault event' and 'fault hypothesis' objects of the special productivity model from FIG. 3. The OEE script referred to as the verification script in FIG. 4 is consequently derived for the special fault tree from the productivity model and stored as a source code in a data store.

In step 400, the source code is translated into an executable program in the data processing device 20 and is stored in the data store.

In step 500, the access to the executable program and the cyclical execution, for example every 2 seconds, takes place. The program checks the data from the master control system for fault events in accordance with the conditions in the script. If an event is detected, the fault data are then written into the fault database.

FIG. 3 shows a conceptual representation of the productivity model. The central objects for the automated determination of fault events are fault event, fault hypothesis and verification. The fault event represents the uppermost level of a logical tree structure, such as for example the papermaking machine fault that is represented in FIG. 5. Hypotheses for causes of faults represent the level thereunder. Each hypothesis in the model has an association with a 'verification object'. The attributes of the verification are used for the generation of the OEE script. The main attributes that are used are reference, data source and action. The action includes the condition for the verification and the reference includes the test criterion. The data source indicates the source of the data that are checked in the condition. The objects installation part and effect are of subordinate significance in the context of the script generation.

FIG. 4 shows an OEE script for verifying fault hypotheses of a papermaking machine. The fault hypotheses for a stoppage, fiber breakage and creeping speed are concerned here. If a fault is detected, the script writes status information into the fault database.

FIG. 5 shows the fault tree for a papermaking machine. The fault event of a papermaking machine fault has fiber breakage, stoppage and creeping as hypotheses for causes of faults.

We claim:

1. A method for an automated determination of fault events by evaluation of field data of a production installation within a system for determining an effectiveness of the production installation and for an analysis of causes of faults, which comprises the steps of:

providing a data processing device having a fault event detector, an overall equipment effectiveness (OEE) script configurer, and programs stored therein for carrying out functions of the fault event detector and the OEE script configurer, the data processing device further including a fault database for storing determined fault events and an OEE script memory, the OEE being defined as a multiplication of synergistic parameters;

determining fault events by the steps of:

using the OEE script configurer to access a prescribed productivity model specific to the production installation, generate an OEE script with likewise prescribed configuration data taken into account, and store the OEE script in the OEE script memory; and using the fault event detector to access the OEE script, call up the field data from a data server of the production installation according to execution requirements of the OEE script, derive the fault events from the field data according to processing instructions of the OEE script, and store the fault events together with previously entered fault events, in the fault database; and analyzing causes of faults.

2. The method according to claim 1, wherein the prescribed productivity model specific to the production installation is prescribed by a WEB browser calling up a productivity model specific to the production installation stored on a WEB server and feeding it to the OEE script configurer.

3. The method according to claim 1, which comprises entering additional information on the fault events taken into account by the fault event detector in a determination of the fault events into the data processing device using a data input.

* * * * *